US012688617B2

(12) United States Patent
Li et al.

(10) Patent No.: US 12,688,617 B2
(45) Date of Patent: Jul. 21, 2026

(54) METHOD AND APPARATUS FOR PROCESSING THREE DIMENSIONAL GRAPHIC DATA, DEVICE, STORAGE MEDIUM AND PRODUCT

(71) Applicant: BEIJING BAIDU NETCOM SCIENCE TECHNOLOGY CO., LTD., Beijing (CN)

(72) Inventors: Guodong Li, Beijing (CN); Jingang Yan, Beijing (CN); Jingyuan Wang, Beijing (CN); Hongchi Zhang, Beijing (CN); Bin Hu, Beijing (CN); Wenzhang Xiao, Beijing (CN); Zhanbiao Shi, Beijing (CN); Chenxing Wen, Beijing (CN); Kunpeng Wang, Beijing (CN); Panpan Xu, Beijing (CN); Xiaohu Ma, Beijing (CN); Ruixin Sun, Beijing (CN); Zhiming Zhang, Beijing (CN); Lantian Shangguan, Beijing (CN); Huan Deng, Beijing (CN); Jia Song, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 828 days.

(21) Appl. No.: 18/109,992

(22) Filed: Feb. 15, 2023

(65) Prior Publication Data

US 2023/0196674 A1      Jun. 22, 2023

(30) Foreign Application Priority Data

Feb. 21, 2022    (CN) ........................ 202210158231.X

(51) Int. Cl.
*G06T 9/00* (2006.01)
*G06F 18/24* (2023.01)
(Continued)

(52) U.S. Cl.
CPC .............. *G06T 9/001* (2013.01); *G06F 18/24* (2023.01); *G06T 9/40* (2013.01); *G06T 15/20* (2013.01);
(Continued)

(58) Field of Classification Search
None
See application file for complete search history.

(56) References Cited

U.S. PATENT DOCUMENTS 6,215,500 B1     4/2001  Deering
2002/0158865 A1  10/2002  Dye et al.
(Continued)

FOREIGN PATENT DOCUMENTS

CN         1655191 A  *  8/2005
CN       101655992 A     2/2010
(Continued)

OTHER PUBLICATIONS

Zhang C et al., 3D Visualization of High Precision Map Lanes, Jisu Anjiyu Xiandaihua, 2020, pp. 21-25; 55.
(Continued)

*Primary Examiner* — Jwalant Amin
(74) *Attorney, Agent, or Firm* — Dilworth IP, LLC

(57) ABSTRACT

The present disclosure provides a method and apparatus for processing three dimensional graphic data, a device, a storage medium and a product, relating to a field of artificial intelligence, in particular to a field of autonomous driving. The specific implementation is: receiving a data compression request for a target graphic element in a three dimensional electronic map, and obtaining at least one vertex data corresponding to the target graphic element; extracting a global coordinate matrix with a shared attribute in the at least one vertex data; extracting local coordinate data with a private attribute respectively corresponding to the at least
(Continued)

Receiving a data compression request for a target graphic element in a three dimensional electronic map, and obtaining at least one vertex data corresponding to the target graphic element — 201

Extracting a global coordinate matrix with a shared attribute in the at least one vertex data — 202

Extracting local coordinate data with a private attribute respectively corresponding to the at least one vertex data — 203

Sending, in response to a graphic drawing request for the target graphic element, the global coordinate matrix and the local coordinate data respectively corresponding to the at least one vertex data to a graphic display device — 204 one vertex data; and sending, in response to a graphic drawing request for the target graphic element, the global coordinate matrix and the local coordinate data respectively corresponding to the at least one vertex data to a graphic display device.

20 Claims, 4 Drawing Sheets

(51) Int. Cl.

| | |
|---|---|
| *G06T 9/40* | (2006.01) |
| *G06T 15/20* | (2011.01) |
| *G06T 17/00* | (2006.01) |
| *G06T 17/05* | (2011.01) |
| *G06T 17/20* | (2006.01) |
| *H04N 19/597* | (2014.01) |
| *H04N 19/60* | (2014.01) |
| *G06V 20/64* | (2022.01) |

(52) U.S. Cl.
CPC ............ *G06T 17/005* (2013.01); *G06T 17/05* (2013.01); *G06T 17/20* (2013.01); *H04N 19/597* (2014.11); *H04N 19/60* (2014.11); *G06V 20/64* (2022.01)

(56) References Cited

U.S. PATENT DOCUMENTS

| | | | | |
|---|---|---|---|---|
| 2004/0176908 A1* | 9/2004 | Senda | ................... | G09B 29/10 |
| | | | | 340/995.11 |
| 2009/0184956 A1 | 7/2009 | Kim et al. | | |

| | | | | |
|---|---|---|---|---|
| 2013/0300740 A1 | 11/2013 | Snyder et al. | | |
| 2015/0373331 A1 | 12/2015 | Krutsch et al. | | |
| 2021/0295566 A1 | 9/2021 | Graziosi et al. | | |
| 2023/0036982 A1* | 2/2023 | Salam | ..................... | G06T 19/20 |
| 2023/0360381 A1* | 11/2023 | Lee | ........................ | G06V 10/82 |

FOREIGN PATENT DOCUMENTS

| | | | | | |
|---|---|---|---|---|---|
| CN | 104183023 A | * | 12/2014 | | |
| CN | 105893565 A | | 8/2016 | | |
| CN | 107093197 A | | 8/2017 | | |
| CN | 110442393 A | | 11/2019 | | |
| CN | 110956673 A | | 4/2020 | | |
| CN | 111080781 A | | 4/2020 | | |
| CN | 113808241 A | * | 12/2021 | .......... | G06T 15/005 |
| CN | 117319682 A | | 12/2023 | | |
| EP | 4184924 A1 | * | 5/2023 | ......... | H04N 21/8547 |
| JP | 3657518 B2 | * | 6/2005 | ............ | G06T 15/20 |
| TW | I706380 B | * | 10/2020 | .......... | G06T 15/005 |
| WO | WO-2018196738 A1 | * | 11/2018 | .......... | G06T 19/006 |

OTHER PUBLICATIONS

First Office Action in CN Patent Application No. 202210158231.X dated Mar. 30, 2024.

Graziosi, Danillo Bracco, Video-Based Dynamic Mesh Coding, IEEE International Conference on Image Processing (ICIP), 2021, pp. 3133-3137.

Graziosi et al., [VPCC] [EE2.6-related] Mesh Patch Data, International Organisation for Standisation, ISO/IEC JTC 1/SC 29/WG 7 Coding of Moving Pictures and Audio, Online-Oct. 2020, pp. 1-14.

European Search Report in EP Patent Application No. 23157223.1 dated Jul. 14, 2023.

\* cited by examiner

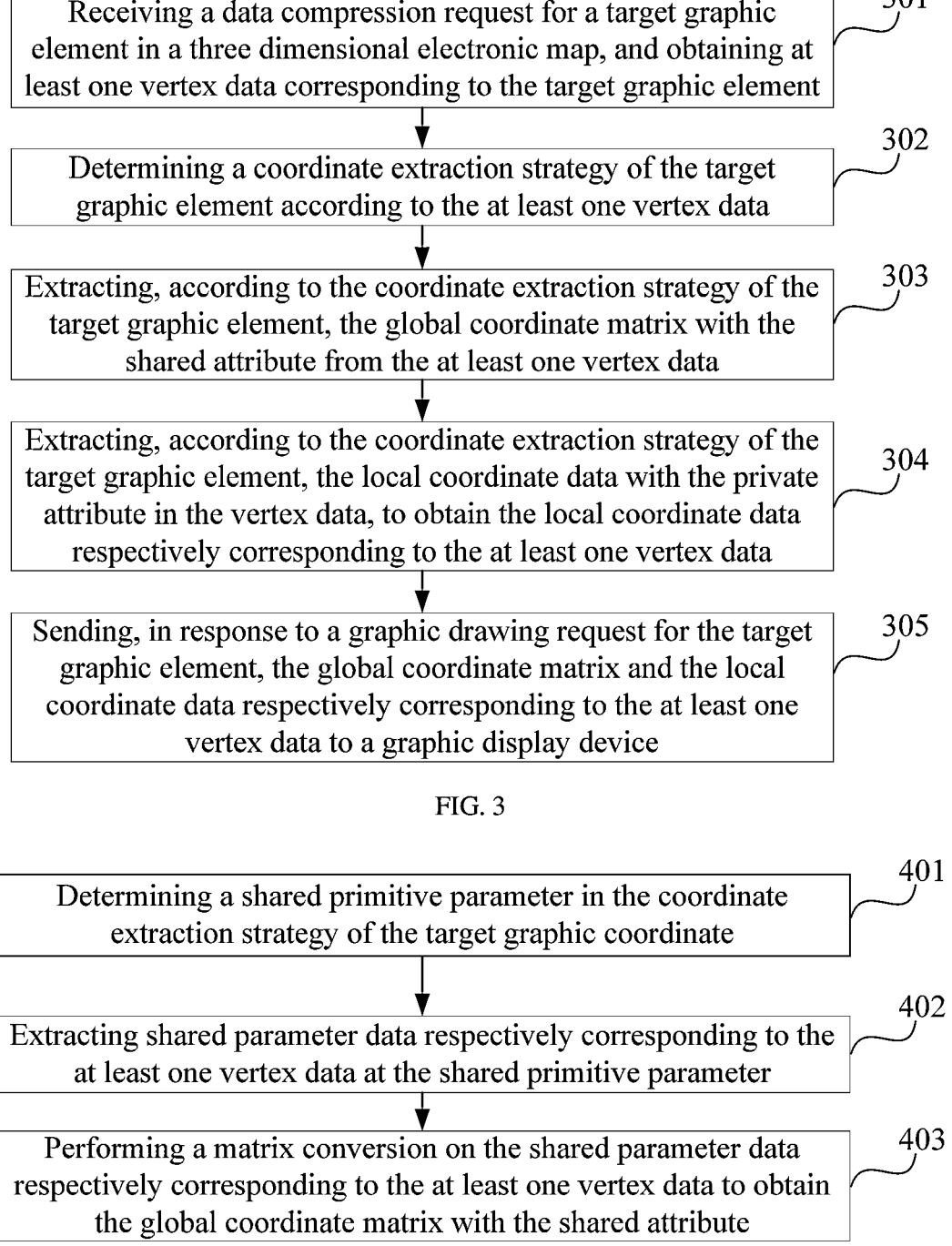

Receiving a data compression request for a target graphic element in a three dimensional electronic map, and obtaining at least one vertex data corresponding to the target graphic element                301

Determining a coordinate extraction strategy of the target graphic element according to the at least one vertex data                302

Extracting, according to the coordinate extraction strategy of the target graphic element, the global coordinate matrix with the shared attribute from the at least one vertex data                303

Extracting, according to the coordinate extraction strategy of the target graphic element, the local coordinate data with the private attribute in the vertex data, to obtain the local coordinate data respectively corresponding to the at least one vertex data                304

Sending, in response to a graphic drawing request for the target graphic element, the global coordinate matrix and the local coordinate data respectively corresponding to the at least one vertex data to a graphic display device                305

FIG. 3

Determining a shared primitive parameter in the coordinate extraction strategy of the target graphic coordinate                401

Extracting shared parameter data respectively corresponding to the at least one vertex data at the shared primitive parameter                402

Performing a matrix conversion on the shared parameter data respectively corresponding to the at least one vertex data to obtain the global coordinate matrix with the shared attribute                403

FIG. 4

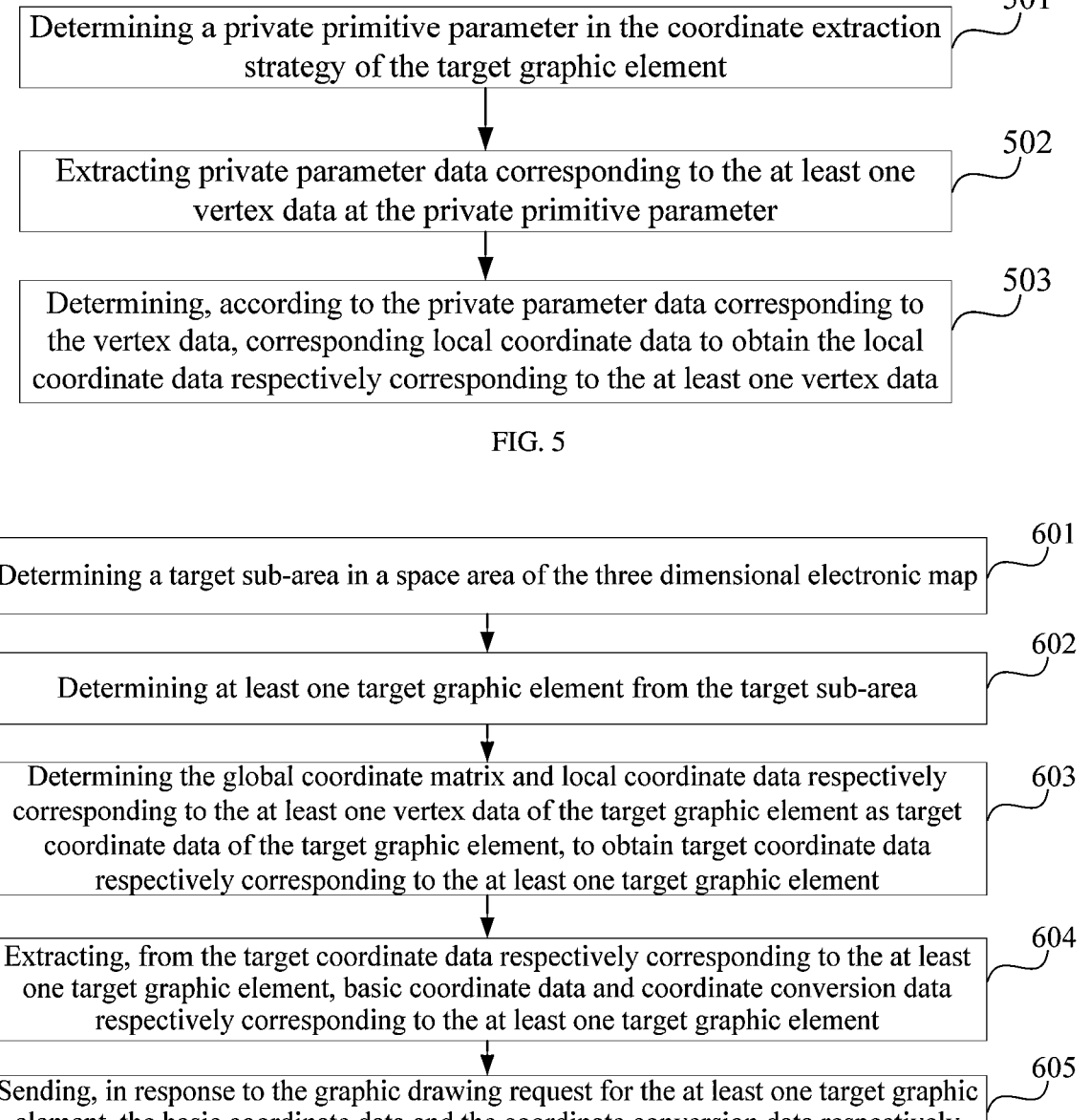

Determining a private primitive parameter in the coordinate extraction strategy of the target graphic element ⌐⌐ 501

Extracting private parameter data corresponding to the at least one vertex data at the private primitive parameter ⌐⌐ 502

Determining, according to the private parameter data corresponding to the vertex data, corresponding local coordinate data to obtain the local coordinate data respectively corresponding to the at least one vertex data ⌐⌐ 503

FIG. 5

Determining a target sub-area in a space area of the three dimensional electronic map ⌐⌐ 601

Determining at least one target graphic element from the target sub-area ⌐⌐ 602

Determining the global coordinate matrix and local coordinate data respectively corresponding to the at least one vertex data of the target graphic element as target coordinate data of the target graphic element, to obtain target coordinate data respectively corresponding to the at least one target graphic element ⌐⌐ 603

Extracting, from the target coordinate data respectively corresponding to the at least one target graphic element, basic coordinate data and coordinate conversion data respectively corresponding to the at least one target graphic element ⌐⌐ 604

Sending, in response to the graphic drawing request for the at least one target graphic element, the basic coordinate data and the coordinate conversion data respectively corresponding to the at least one target graphic element to a graphic display device ⌐⌐ 605

FIG. 6

METHOD AND APPARATUS FOR PROCESSING THREE DIMENSIONAL GRAPHIC DATA, DEVICE, STORAGE MEDIUM AND PRODUCT

CROSS-REFERENCE TO RELATED APPLICATIONS

This application claims priority to Chinese Patent Application No. 202210158231.X, filed on Feb. 21, 2022, which is hereby incorporated by reference in its entirety.

TECHNICAL FIELD

The present disclosure relates to a field of autonomous driving in a field of artificial intelligence, in particular to a method and apparatus for processing three dimensional graphic data, a device, a storage medium and a product.

BACKGROUND

Three dimensional graphics are used in the fields of computer-aided design and manufacturing (CAD/CAM), autonomous driving, scientific computing visualization, display and drawing of land information and natural resources, virtual reality, management and office automation, computer-aided teaching, computer animation, computer games, etc. increasingly widespread. The display of the three dimensional graphic need a plenty of vertex data. The vertex data may include component attributes such as vertex coordinates, texture coordinates, vertex normals and vertex colors, etc. The display of the three dimensional graphics is mainly the display of a graphic element, the graphic element may include multiple vertex data. When a three dimensional graphic is displayed, since the display of the three dimensional graphic is usually completed by multiple vertex data. The vertex data is large and contains multiple component attributes, and a processing amount of the data is large, which leads to the complex display processing process of the three-dimensional graphic data, and the low processing efficiency of the data.

SUMMARY

The present disclosure provides a method for processing three dimensional graphic data used for a three dimensional electronic map.

According to a first aspect of the present disclosure, a method for processing three dimensional graphic data is provided, including:

receiving a data compression request for a target graphic element in a three dimensional electronic map, and obtaining at least one vertex data corresponding to the target graphic element;

extracting a global coordinate matrix with a shared attribute in the at least one vertex data;

extracting local coordinate data with a private attribute respectively corresponding to the at least one vertex data;

sending, in response to a graphic drawing request for the target graphic element, the global coordinate matrix and the local coordinate data respectively corresponding to the at least one vertex data to a graphic display device, where the global coordinate matrix and the local coordinate data respectively corresponding to the at least one vertex data are used for drawing and displaying the target graphic element by the graphic display device.

According to a second aspect of the present disclosure, an electronic device is provided, including:

at least one processor, and a memory communicatively connected to the at least one processor; where, the memory stores instructions executable by the at least one processor, the instructions being executable by the at least one processor, to enable the at least one processor to execute the method of the first aspect.

According to a third aspect of the present disclosure, a non-transitory computer readable storage medium having computer instructions stored therein is provided, where the computer instructions are used to cause the computer to execute the method of the first aspect.

It should be understood that, content described in this part is neither intended to identify the key or important features of embodiments of the present disclosure, nor is it used to limit the scope of the present disclosure. Other features of the present disclosure will be easily understood by the following description.

BRIEF DESCRIPTION OF DRAWINGS

The drawings are for a better understanding of this solution and do not constitute a limitation to the present disclosure.

FIG. 3 is a flowchart of another embodiment of a method for processing three dimensional graphic data provided by an embodiment of the present disclosure.

FIG. 4 is a flowchart of another embodiment of a method for processing three dimensional graphic data provided by an embodiment of the present disclosure.

FIG. 5 is a flowchart of another embodiment of a method for processing three dimensional graphic data provided by an embodiment of the present disclosure.

FIG. 6 is a flowchart of another embodiment of a method for processing three dimensional graphic data provided by an embodiment of the present disclosure.

DETAILED DESCRIPTION OF EMBODIMENTS

Figure 1:
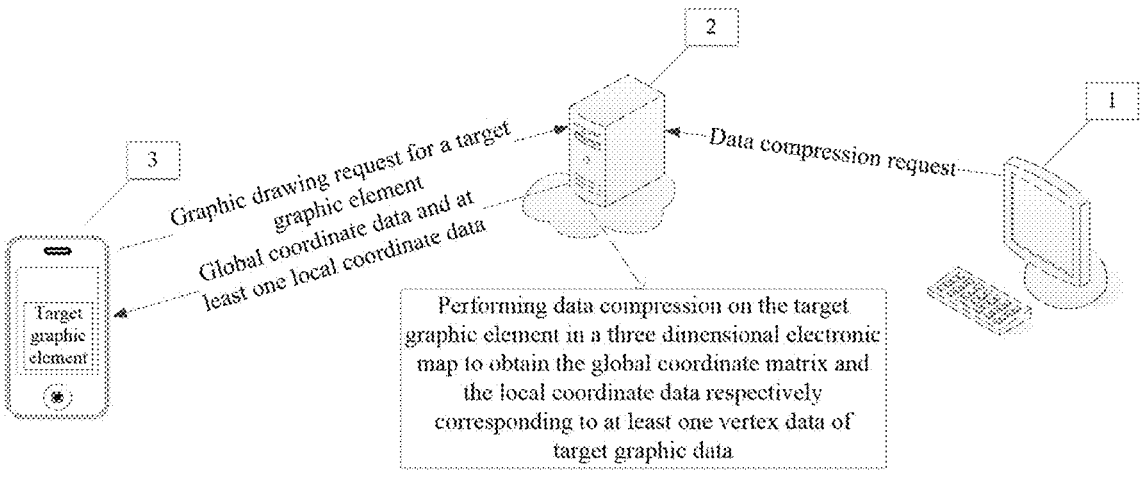
FIG. 1 is a system architecture diagram of a method for processing three dimensional graphic data provided by an embodiment of the present disclosure.

Exemplary embodiments of the present disclosure will be described hereunder with reference to the accompanying drawings, which include therein various details of the embodiments of the present disclosure to facilitate understanding and should be considered as to be merely exemplary. Therefore, those of ordinary skill in the art should realize that various changes and modifications can be made to the embodiments described herein without departing from the scope and spirit of the present disclosure. Likewise, for clarity and conciseness, descriptions of well-known functions and structures are omitted in the following description.

The technical solution of the present disclosure can be applied in a display scenario of a graphic element of a three dimensional electronic map, by compressing at least one vertex data of the three dimensional graphic element into the global coordinate matrix and the local coordinate data, the effective compression of at least one vertex data is realized, and then using the compressed global coordinate matrix and local coordinate data of the respective vertex data to display and draw the three dimensional graphic element, and an efficiency of graphic drawing can be effectively improved due to the reduction of a data amount.

In a related art, for the graphic element of the three dimensional electronic map, usually at least one vertex data of the three graphic element is compressed directly, for example, a solution of compressing three dimensional grid data, these solutions will perform compressing to at least one vertex data in a large ration, the data amount after compressing is still large. In addition, when the compressed data is used for graphic display, serious graphic distortion will occur, which leads to insufficient compression and data distortion.

In order to solve the above problems, in the embodiments of the present disclosure, shared coordinate and the local coordinate data between at least one vertex data of the graphic element are considered comprehensively, so that only the shared global coordinate matrix and the local coordinate data of the respective vertex data are retained for at least one vertex data, these two types of coordinates integrate global and local information of at least one vertex data, making the coordinate accuracy is higher. And due to the use of the global coordinate matrix, a data amount of at least one vertex data can be extremely reduced, and more effective compression of the data is realized; the use of the local coordinate data can ensure that coordinate information of each vertex is retained, and an accuracy of data is ensured, and the problems of less compression of the data amount and data distortion in the prior art are solved.

In the technical solution of the present disclosure, a data compression request for a target graphic element in a three dimensional electronic map can be received, and at least one vertex data corresponding to the target graphic element is obtained. Then the local coordinate data with a private attribute respectively corresponding to the at least one vertex data can be extracted at the same time when the global coordinate data with the shared attribute in at least one vertex data is extracted. The global coordinate data and the local coordinate data respectively corresponding to the at least one vertex data can be a drawing basis of the target graphic element. In response to a graphic drawing request for the target graphic element, the global coordinate matrix and the local coordinate data respectively corresponding to the at least one vertex data can be sent to a graphic display device. The graphic display device can draw the target graphic element based on the received global coordinate data and the local coordinate data respectively corresponding to the at least one vertex data, and display the target graphic element whose drawing has been completed. Through the global coordinate data and the local coordinate data respectively corresponding to the at least one vertex data, the data amount of at least one vertex data can be effectively reduced, and effective compression of the data amount is realized. At the same time, the target graphic element can be accurately drawn by the use of the global coordinate data and the local coordinate data respectively corresponding to at least one vertex data, where personalized information of respective vertexes is included, and an accuracy of drawing is improved. The effective data compression and accurate graphic display of the target graphic element are realized, and a compression efficiency and a display accuracy are improved.

The present disclosure provides a method and apparatus for processing three dimensional graphic data, a device, a storage medium and a product, applied in the field of autonomous driving in the field of artificial intelligence, in order to achieve the purpose of improving a data compression efficiency of the three dimensional graphic and at the same time improving the display accuracy, and avoiding a display deformation.

Next, the technical solution of the present disclosure will be introduced in detail with reference to the attached drawings.

Refer to FIG. 1, it is a system architecture diagram of a method for processing three dimensional graphic data provided by an embodiment of the present disclosure, the system architecture as shown in FIG. 1 may include a compression control device 1, an electronic device 2 and a graphic display device 3. In an actual application, the compression control device may be a computer 1, the electronic device may be a cloud server 2 and the graphic display device may be an autonomous vehicle 3. Among them, both the compression control device 1 and the graphic display device 3 can establish a wired or wireless communicatively connection with the electronic device 2. Of course, in some special application scenarios, the compression control device 1 and the electronic device 2 may be the same device, the system architecture as shown in FIG. 1 is merely schematic and does not constitute specific limitation to the system architecture suitable for the embodiments of the present disclosure. In addition, specific device types of the compression control device 1, the electronic device 2 and the graphic display device 3 as shown in FIG. 1 are merely schematic, and should not constitute a limitation to the specific types of respective devices, the specific types of respective devices will not be limited too much in the embodiments of the present disclosure.

Refer to the system architecture as shown in FIG. 1, the electronic device 2 can be configured with the method for processing three dimensional graphic data of the present disclosure. The compression control device 1 can send a data compression request to the electronic device 2. Then the electronic device 2 can perform data compression to the target graphic element in the three dimensional electronic map based on the method for processing three dimensional graphic data of the present disclosure. The graphic display device 3 can send a graphic drawing request of the target graphic element to the electronic device 2. The electronic device 2 can send, in response to the graphic drawing request for the target graphic element, the global coordinate matrix and the local coordinate data respectively corresponding to the at least one vertex data to a graphic display device 3. The graphic display device 3 can receive the global coordinate matrix and the local coordinate data respectively corresponding to the at least one vertex data, and draw and display the target graphic element according to the global coordinate matrix and the local coordinate data respectively corresponding to the at least one vertex data, so as to achieve fast and accurate drawing to the target graphic element using the compressed data.

Figure 2:
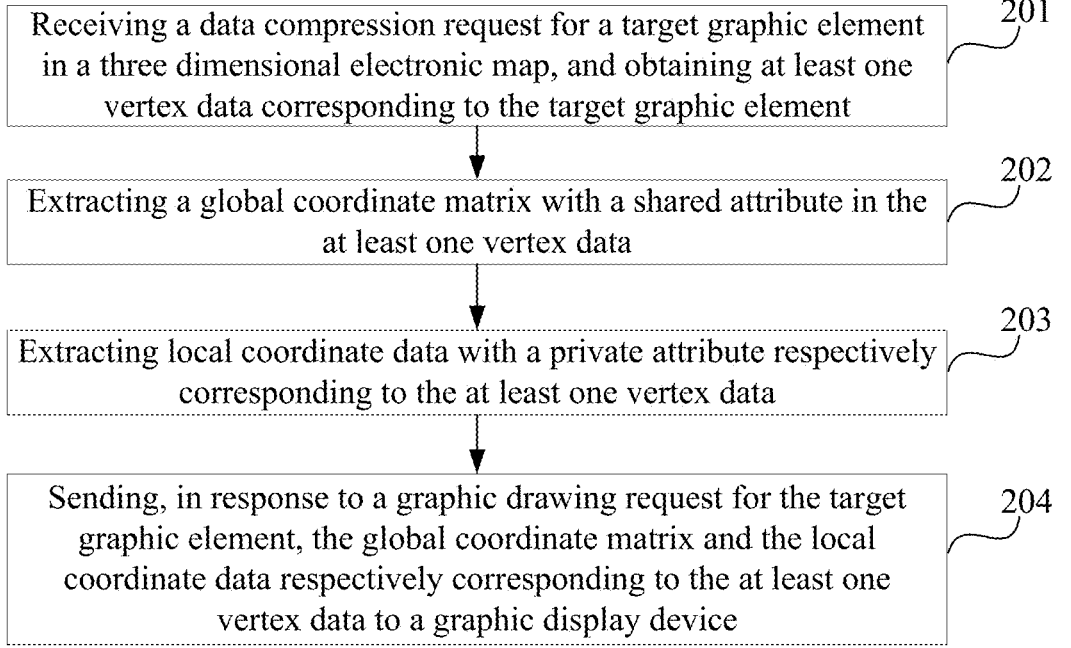
FIG. 2 is a flowchart of another embodiment of a method for processing three dimensional graphic data provided by an embodiment of the present disclosure.

As shown in FIG. 2, it is a flowchart of an embodiment of a method for processing three dimensional graphic data provided by an embodiment of the present disclosure, the method may be configured in an apparatus for processing three dimensional graphic data, the apparatus for processing three dimensional graphic data may locate in an electronic device. The method for processing three dimensional graphic data may include the following steps.

201, receiving a data compression request for a target graphic element in a three dimensional electronic map, and obtaining at least one vertex data corresponding to the target graphic element.

The vertex data may include component attributes such as vertex coordinates, texture coordinates, vertex normals and vertex colors, etc., and may be three graphic data. The vertex data has many component attributes, which leads to an actually large memory amount occupied by the vertex data.

The at least one vertex data of the target graphic element can be obtained by the use of an element identifier of the target graphic element. The three dimensional electronic map can correspond to multiple graphic elements, at least one vertex data of each graphic element can be known. At least one vertex data of the graphic element can be set when constructing the electronic map.

In an embodiment, the receiving the data compression request for the target graphic element in the three dimensional electronic map may include: receiving the data compression request sent by a data compression device, where the data compression request includes the target graphic element of the three dimensional electronic map.

The receiving the data compression request for the target graphic element in the three dimensional electronic map may include: detecting the target graphic element selected by a user from the three dimensional electronic map.

In an actual application, the graphic element, for example, may include objects located in a three dimensional space such as a building, a wall, a column, a pavement, a road sign, a sign, a speed bump, a parking space, a lane marking, a crosswalk, a vehicle etc.

202, extracting a global coordinate matrix with a shared attribute in the at least one vertex data.

The global coordinate matrix may be composed of data with the shared attribute in the at least one vertex data, and may refer to the same data in the at least one vertex data. The global coordinate matrix may be part of data of any vertex data. Since the vertex data may include multiple component attributes, the global coordinate matrix may be multiple data with a same component attribute of the vertex data. For example, assuming that vertex data of A1 is "30,10,0.2", vertex data of A2 is "30,10,0.1", then "30,10" therein may be the global coordinate matrix. Of course, the above instance of the vertex data is merely schematic, and should not constitute a limitation to a data format of vertex data, in an actual application, the vertex data is actually more complex, but is determined based on multiple attribute components.

203, extracting local coordinate data with a private attribute respectively corresponding to the at least one vertex data.

The local coordinate data may be data with the private attribute of the vertex data. The local coordinate data may be determined according to the data with a private attribute of the vertex data. The local coordinate data of different vertex data is different. Also taking the vertex data of A1 and A2 as an example, the vertex data of A1 may be "0.2", and the vertex data of A2 may be "0.1".

204, sending, in response to a graphic drawing request for the target graphic element, the global coordinate matrix and the local coordinate data respectively corresponding to the at least one vertex data to a graphic display device, where the global coordinate matrix and the local coordinate data respectively corresponding to the at least one vertex data are used for drawing and displaying the target graphic element by the graphic display device.

In the embodiment of the present disclosure, a data compression request for a target graphic element in a three dimensional electronic map can be received, and at least one vertex data corresponding to the target graphic element is obtained. Then the local coordinate data with the private attribute respectively corresponding to the at least one vertex data can be extracted at the same time when the global coordinate data with the shared attribute in at least one vertex data is extracted. The global coordinate data and the local coordinate data respectively corresponding to the at least one vertex data can be a drawing basis of the target graphic element. In response to the graphic drawing request for the target graphic element, the global coordinate matrix and the local coordinate data respectively corresponding to the at least one vertex data can be sent to the graphic display device. The graphic display device then can draw the target graphic element based on the received global coordinate data and the local coordinate data respectively corresponding to the at least one vertex data, and display the target graphic element whose drawing has been completed. Through the global coordinate data and the local coordinate data respectively corresponding to the at least one vertex data, the data amount of the at least one vertex data can be effectively reduced, and effective compression of the data amount is realized. At the same time, the target graphic element can be accurately drawn by the use of the global coordinate data and the local coordinate data respectively corresponding to at least one vertex data, where personalized information of respective vertexes is included, and the accuracy of drawing is improved. The effective data compression and accurate graphic display of the target graphic element are realized, and a compression efficiency and a display accuracy are improved.

As shown in FIG. 3, it is a flowchart of another embodiment of a method for processing three dimensional graphic data provided by an embodiment of the present disclosure, the method may be configured in an apparatus for processing three dimensional graphic data, the apparatus for processing three dimensional graphic data may locate in an electronic device. The method for processing three dimensional graphic data may include following steps.

301, receiving a data compression request for a target graphic element in a three dimensional electronic map, and obtaining at least one vertex data corresponding to the target graphic element.

It should be noted, some steps in the embodiment of the present disclosure are the same as some steps in the foregoing embodiments, and are not repeated here for the sake of brevity of description.

302, determining a coordinate extraction strategy of the target graphic element according to the at least one vertex data.

The coordinate extraction strategy may refer to rule information for performing a coordinate extraction on at least one vertex data.

303, extracting, according to the coordinate extraction strategy of the target graphic element, the global coordinate matrix with the shared attribute from the at least one vertex data.

304, extracting, according to the coordinate extraction strategy of the target graphic element, the local coordinate data with the private attribute in the vertex data, to obtain the local coordinate data respectively corresponding to the at least one vertex data.

305, sending, in response to a graphic drawing request for the target graphic element, the global coordinate matrix and the local coordinate data respectively corresponding to the at least one vertex data to a graphic display device, where the global coordinate matrix and the local coordinate data respectively corresponding to the at least one vertex data are used for drawing and displaying the target graphic element by the graphic display device.

In the embodiment of the present disclosure, the at least one vertex data of the target graphic element is obtained, and the coordinate extraction strategy of the target graphic element can be determined according to the at least one vertex data. By the use of the coordinate extraction strategy, the global coordinate matrix with the shared attribute is extracted from the at least one vertex data, and the local coordinate data with the private attribute in the vertex data is extracted, to complete the extraction of the local coordinate data respectively corresponding to the at least one vertex data. Through the at least one vertex data, the coordinate extraction strategy of the target graphic element can be determined accurately; by the use of the determined coordinate extraction strategy, a fast and accurate extraction of the global coordinate matrix and the local coordinate data respectively corresponding to the at least one vertex data is realized.

In order to obtain an accurate coordinate extraction strategy, in some embodiments, the determining the coordinate extraction strategy of the target graphic element according to the at least one vertex data includes:

extracting a geometric feature of the target graphic element according to the at least one vertex data;

performing a geometric category classification on the geometric feature, to obtain a target graphic category of the target graphic element; and determining the coordinate extraction strategy of the target graphic element according to the target graphic category.

The target graphic category can be determined according to the geometric feature.

In an embodiment, graphic fitting is performed on the target graphic element to obtain a fitted target graphic according to the at least one vertex data, the geometric feature of the target graphic element is extracted according to the target graphic.

In the embodiments of the present disclosure, the geometric feature of the target graphic element can be extracted from the at least one vertex data; a classification of geometric category is performed to the geometric feature to obtain a target graphic category of the target graphic element, an accurate graphic category classification can be performed on the target graphic element through the geometric feature. And the obtained target graphic category can be used for the confirmation of the coordinate extraction strategy to realize the accurate acquisition of the coordinate extraction strategy. Corresponding the target graphic category with the coordinate extraction strategy can ensure that the geometric information in the target graphic element can be accurately extracted according to the coordinate extraction strategy, and an accuracy of the coordinate extraction according to the coordinate extraction strategy on the target graphic element is improved.

In a possible design, the performing the geometric category classification on the geometric feature, to obtain the target graphic category of the target graphic element, includes:

determining at least one candidate graphic category, where the candidate graphic category is associated with the coordinate extraction strategy;

calculating a category probability respectively corresponding to the geometric feature in the at least one candidate graphic category;

determining a candidate graphic category with a highest category probability as the target graphic category of the target graphic element;

the determining the coordinate extraction strategy of the target graphic element according to the target graphic category includes:

determining a coordinate extraction strategy associated with the target graphic category as the coordinate extraction strategy of the target graphic element.

In an embodiment, the at least one candidate graphic category may include: at least one of a point, a line, a parametric curve, a surface, a parametric surface, a base volume, a parametric volume and the like. The line may include a line segment, a polyline and/or a closed polyline. The parametric curve may include a circular line, a Bezier curve and/or a B-spline curve. The surface may include a triangle shape/strip/fan, a quadrilateral shape/strip and/or a simple polygon. The parametric surface may include a Bezier curved surface and/or a B-spline curved surface. The base volume may include a ring, a cone, a cuboid, an ellipsoid, an extrusion volume and/or a swept volume. The parametric volume may include at least one parametric surface in a volume surface. Each graphic category may be associated with a corresponding coordinate extraction strategy. The coordinate extraction strategy can be determined according to a category feature of the graphic category.

In the embodiment of the present disclosure, when determining the target graphic category of the target graphic element, the at least one candidate graphic category can be determined firstly, to calculate and obtain the category probability respectively corresponding to the geometric feature in the at least one candidate graphic category, and from which the candidate graphic category with the highest category probability is determined as the target graphic category of the target graphic element. By the use of the calculation of the category probability, the category probability of the geometric feature in the at least one candidate graphic category can be accurately measured, and from which the candidate graphic category corresponding to a maximum category probability is determined as the target graphic category, and the target graphic category is selected with a more intuitive probability, to improve an acquisition efficiency and an accuracy of the target graphic category.

In a possible design, as shown in FIG. 4, the differences from that of FIG. 3 lies in that, step 303 in FIG. 3, the extracting, according to the coordinate extraction strategy of the target graphic element, the global coordinate matrix with the shared attribute from the at least one vertex data, that is the extraction step of the global coordinate matrix may include:

401, determining a shared primitive parameter in the coordinate extraction strategy of the target graphic coordinate;

402, extracting shared parameter data respectively corresponding to the at least one vertex data at the shared primitive parameter;

403, performing a matrix conversion on the shared parameter data respectively corresponding to the at least one vertex data to obtain the global coordinate matrix with the shared attribute.

In an actual application, the shared parameter data respectively corresponding to the at least one vertex data is the same, therefore, in some embodiments, the performing the matrix conversion on the shared parameter data respectively corresponding to the at least one vertex data to obtain the global coordinate matrix with the shared attribute may include performing the matrix conversion on the shared parameter data of any vertex data according to a size of a target matrix, to obtain the global coordinate matrix with the shared attribute. The performing the matrix conversion on the shared parameter data according to the size of the target matrix, for example, may include determining an intermediate matrix according to the size of the target matrix, and performing the matrix calculation on the shared parameter data and the intermediate matrix, to obtain the global coordinate matrix. Of course, in order to improve an acquisition efficiency of the global coordinate matrix, the shared parameter data can be directly used as the global coordinate matrix.

In a possible design, a data format of the vertex data is known, therefore, positions of same data in respective vertex data are known, therefore, a shared data bit corresponding to the shared primitive parameter can be determined, the data of the shared data bit is read from the vertex data according to the shared data bit of the shared primitive parameter, and the global coordinate matrix is obtained by performing the matrix conversion on the data of the read shared date bit.

The shared primitive parameter may be a parameter in the vertex data that describes information of a vertex more accurately, and its data amount is large. The private primitive parameter may be a parameter in the vertex data that describes the information of the vertex in a more personalized and simple form, and its data amount is less. The data amount of the global coordinate matrix is greater than the data amount of the local coordinate data. By retaining a copy of the global coordinate matrix, a data storage amount can be effectively retrieved. And the local coordinate data respectively corresponding to at least one vertex data ensures coordinate precision of the vertex data. Through a storage manner of the global coordinate and the local coordinate, an accuracy of data expression can be improved while a storage amount of the vertex data is effectively reduced, the graphic distortion during display is avoided, and the display accuracy is ensured.

In the embodiment of the present disclosure, the shared primitive parameter in the coordinate extraction strategy of the target graphic coordinate can be determined, so as to extract the shared parameter data respectively corresponding to the at least one vertex data at the shared primitive parameter, to realize the extraction of the shared parameter data of each vertex data. Then the global coordinate matrix with the shared attribute can be obtained by performing the matrix conversion according to the shared parameter data respectively corresponding to the at least one vertex data. Through the conversion of the shared parameter data, an accurate extraction of the global coordinate matrix can be realized.

In a possible design, as shown in FIG. 5, the differences from that of FIG. 3 lies in that, step 304 in FIG. 3, the extracting, according to the coordinate extraction strategy of the target graphic element, the local coordinate data with the private attribute in the vertex data, to obtain the local coordinate data respectively corresponding to the at least one vertex data, that is, the extraction step of the local coordinate data may include:

501: determining a private primitive parameter in the coordinate extraction strategy of the target graphic element;

502: extracting private parameter data corresponding to the at least one vertex data at the private primitive parameter;

503: determining, according to the private parameter data corresponding to the vertex data, corresponding local coordinate data to obtain the local coordinate data respectively corresponding to the at least one vertex data.

In an actual application, the local coordinate data respectively corresponding to the at least one vertex data may be different. The local coordinate data of different vertex data is different. Through the private primitive parameter, the local coordinate data of the vertex data can be accurately extracted. In a possible design, a data format of the vertex data is known, therefore, positions of data with differences in respective vertex data are known, therefore, a private data bit corresponding to the private primitive parameter can be determined, data of the private data bit is read from the vertex data according to the private data bit of the private primitive parameter, to obtain the local coordinate data.

In the embodiment of the present disclosure, after the private primitive parameter is determined, the private parameter data corresponding to the at least one vertex data at the private primitive parameter can be extracted. An accurate extraction of the private parameter data is realized. According to the private parameter data corresponding to the vertex data, corresponding local coordinate data is determined, and the local coordinate data respectively corresponding to the at least one vertex data can be obtained. An accurate extraction of the local coordinate data respectively corresponding to the at least one vertex data is realized.

As shown in FIG. 6, it is a flowchart of another embodiment of a method for processing three dimensional graphic data provided by an embodiment of the present disclosure, the method may configured in an apparatus for processing three dimensional graphic data, the apparatus for processing three dimensional graphic data may locate in an electronic device. After the global coordinate matrix and the local coordinate data respectively corresponding to the at least one vertex data of the target graphic element are extracted, the method for processing three dimensional graphic data may further include following steps:

601: determining a target sub-area in a space area of the three dimensional electronic map;

602: determining at least one target graphic element from the target sub-area;

603: determining the global coordinate matrix and local coordinate data respectively corresponding to the at least one vertex data of the target graphic element as target coordinate data of the target graphic element, to obtain target coordinate data respectively corresponding to the at least one target graphic element; and 604: extracting, from the target coordinate data respectively corresponding to the at least one target graphic element, basic coordinate data and coordinate conversion data respectively corresponding to the at least one target graphic element, where the coordinate conversion data is obtained by performing a conversion and calculation on the target coordinate data and the basic coordinate data.

In an embodiment, the extracting, from the target coordinate data respectively corresponding to the at least one target graphic element, the basic coordinate data may include:

determining a coordinate distance between the target coordinate data respectively corresponding to the at least one target graphic element and an origin of a coordinate system, and selecting target coordinate data of a target graphic element with a shortest distance from the coordinate distances as the basic coordinate data. Usually, if the target coordinate data respectively corresponding to the at least one target graphic element includes coordinate data corresponding to an origin of a coordinate, the coordinate data corresponding to the origin of the coordinate can be directly used as the basic coordinate data. Of course, in an actual application, the target coordinate data of any target graphic element can be selected from the at least one target graphic element as the basic coordinate data.

The coordinate conversion data corresponding to any target graphic element can be obtained by performing the conversion and calculation according to the target coordinate data and the basic coordinate data of the target graphic element. Usually, multiply the basic coordinate data and the matrix of the coordinate conversion data, and the obtained matrix product can be the target coordinate data. The coordinate conversion data can be obtained by performing a matrix inverse calculation according to the matrix calculation relationship.

605: sending, in response to the graphic drawing request for the at least one target graphic element, the basic coordinate data and the coordinate conversion data respectively corresponding to the at least one target graphic element to the graphic display device.

The basic coordinate data and the coordinate conversion data respectively corresponding to the target graphic element are used for determining the target coordinate data respectively corresponding to the at least one target graphic element; and the target coordinate data respectively corresponding to the at least one target graphic element is provided to the graphic display device to respectively display a corresponding target graphic element.

In the embodiment of the present disclosure, when determining the target sub-area in the space area of the three dimensional electronic map, the at least one target graphic element can be determined from the target sub-area. The target graphic element can compress the at least one vertex data into the target coordinate data corresponding to the global coordinate matrix and the local coordinate data respectively corresponding to the at least one vertex data. Further data compression can be performed to the at least target graphic element, that is from the target coordinate data respectively corresponding to the at least one target graphic element, the basic coordinate data and the coordinate conversion data respectively corresponding to the at least one target graphic element are extracted. The coordinate conversion data can be obtained by the target coordinate data conversion of the basic coordinate data and the target coordinate data of the target graphic element, the corresponding target coordinate data can be obtained in combination with the basic coordinate data and the coordinate conversion data of each target graphic element. Secondary compression on the respective target coordinate data of the at least one target graphic element is realized, and the compression will not affect a restoration of the target coordinate data, which can ensure that the target coordinate data can be accurately obtained. In response to the graphic drawing request for the at least one target graphic element, the basic coordinate data and the coordinate conversion data respectively corresponding to the at least one target graphic element to the graphic display device, the graphic display device can determine the corresponding target coordinate data according to the coordinate conversion data of respective target graphic element in combination the corresponding basic coordinate data. And the target coordinate data may actually include the global coordinate matrix and the local coordinate data respectively corresponding to the at least one vertex data of the target graphic element. Through an accuracy conversion of the coordinate, the accurate coordinate data can be obtained, fast and accurate display of the target graphic matrix can be realized by the use of the target coordinate data, and a processing efficiency and a display efficiency of the data of the graphic element are improved.

As an embodiment, the determining the target sub-area in the space area of the three dimensional electronic map includes:

dividing the space area of the three dimensional electronic map into at least one map sub-area according to a tree-like area division rule;

combining the at least one map sub-area in accordance with a spatial position to obtain an area tree, where the map sub-area is a node in the area tree, and the area tree includes at least one layer; and determining any map sub-area as the target sub-area from the area tree.

The area tree division rule may include any one of common data structure division rules, such as an octree division rule and an area tree (Range) division rule. Through the area tree, the target sub-area can be found fast. The determining any map sub-area as the target sub-area from the area tree may include: determining any map sub-area selected by a user from the area tree as the target sub-area. The user can trigger a viewing request for any map sub-area, the viewing request is sent to an electronic device. The electronic device receives the viewing request, it can obtain the map sub-area contained in the viewing request, and determine the map sub-area as the target sub-area.

In the embodiment of the present disclosure, by the use of the tree-like area division rule, the space area of the three dimensional electronic map is divided into the at least one map sub-area, and the at least one the map sub-area is combined in accordance with the spatial position to obtain the area tree, the map area is the node in the area tree. The area tree may include at least one layer. By determining any map sub-area as the target sub-area from the area tree, a determination speed and an efficiency of the target sub-area can be improved effectively.

In some embodiments, the target sub-area includes at least one candidate graphic element; the determining the at least one target graphic element from the target sub-area includes:

selecting, from the at least one the candidate graphic element of the target sub-area, the at least one target graphic element with a same graphic category and satisfying a graphic compression condition.

The graphic compression condition can be referred to that the selected graphic category is a target compression category. For example, when the graphic category is a point or a line, its data amount is less, and no further compression is need to be performed. When the graphic category is a curved surface, further compression can be performed on its data. The target compression category which needs to be compressed secondarily in the candidate graphic category can be set. From the at least one candidate graphic element, the at least one target graphic element of the target compression category is determined.

The graphic category respectively corresponding to the at least one graphic element can be obtained by performing a graphic category identification of the geometric feature of respective graphic elements. An identification manner of the graphic category may be the same as an identification manner of the target graphic category of the target graphic element in the above-mentioned embodiments, which will not be repeated here.

In the embodiment of the present disclosure, the at least one target graphic element is the at least one target graphic element with a same graphic category and satisfying the graphic compression condition, a selection of the graphic element with a same graphic category and satisfying the graphic compression condition is realized, a targeted selection of the target graphic element is realized, and a selection efficiency and an accuracy of the target graphic element are improved.

In a possible design, after the obtaining the at least one vertex data corresponding to the target graphic element, further including:

detecting a data processing amount of the at least one vertex data;

if it is determined that the data processing amount is less than a processing amount threshold, extracting the global coordinate matrix with the shared attribute in the at least one vertex data and extracting the local coordinate data with the private attribute respectively corresponding to the at least one vertex data, via a central processing unit;

if it is determined that the data processing amount is greater than or equal to the processing amount threshold, extracting the global coordinate matrix with the shared attribute in the at least one vertex data and extracting the local coordinate data with the private attribute respectively corresponding to the at least one vertex data, via a graphic processing unit.

The detecting the data processing amount of the at least one vertex data may include: determining the data processing amount of the at least one vertex data according to average processing information of the vertex data and a data amount of at least one vertex data. The average processing information may include one or more of an average processing amount, an average calculation amount and an average calculation time.

In an embodiment, after the detecting the data processing amount of the at least one vertex data, the method may further include: detecting a first processing performance corresponding to a current central processing unit and a second processing performance corresponding to a graphic processing unit. When the first processing performance is greater than a first performance threshold, it is determined the central processing unit is in an available state. When the second processing performance is greater than a second performance threshold, it is determined the graphic processing unit is in an available state. The first performance threshold can be determined according to a maximum data processing amount of the central processing unit. And the second performance threshold can be determined according to the maximum data processing amount of the graphic processing unit.

The extracting the global coordinate matrix with the shared attribute in the at least one vertex data and extracting the local coordinate data with the private attribute respectively corresponding to the at least one vertex data, via the central processing unit may include: extracting the global coordinate matrix with the shared attribute in the at least one vertex data and extracting the local coordinate data with the private attribute respectively corresponding to the at least one vertex data, via the central processing unit in the available state. The extracting the global coordinate matrix with the shared attribute in the at least one vertex data and extracting the local coordinate data with the private attribute respectively corresponding to the at least one vertex data, via the graphic processing unit may include: extracting the global coordinate matrix with the shared attribute in the at least one vertex data and extracting the local coordinate data with the private attribute respectively corresponding to the at least one vertex data, via the graphic processing unit in the available state.

If it is determined both the central processing unit and the graphic processing unit are in the available state, the above-mentioned threshold determination manner of the data processing amount may be used. If it is determined one of the central processing unit and the graphic processing unit is in the available state, the global coordinate matrix with the shared attribute in the at least one vertex data can be extracted and the local coordinate data with the private attribute respectively corresponding to the at least one vertex data can be extracted directly by the processor in the available state. If it is determined neither of the central processing unit and the graphic processing unit is in the available state, a request for extracting the global coordinate matrix with the shared attribute and extracting the local coordinate data with the private attribute respectively corresponding to the at least one vertex data in the at least one vertex data is buffered in a message queue, to wait and detect the processor in an available state.

In the embodiment of the present application, by detecting the data processing amount of the at least one vertex data, an extraction subject of coordinates can be pre-determined. When the data processing amount is less than a processing amount threshold, the central processing unit can be used to perform the extraction of the global coordinate matrix and the local coordinate data. When the data processing amount is greater than the processing amount threshold, the graphic processing unit can be used to perform the extraction of the global coordinate matrix and the local coordinate data. Through processing efficiencies of two kinds of data amount, an automatic allocation of processing a task can be realized, and a processing efficiency and speed of data can be improved.

Figure 7:
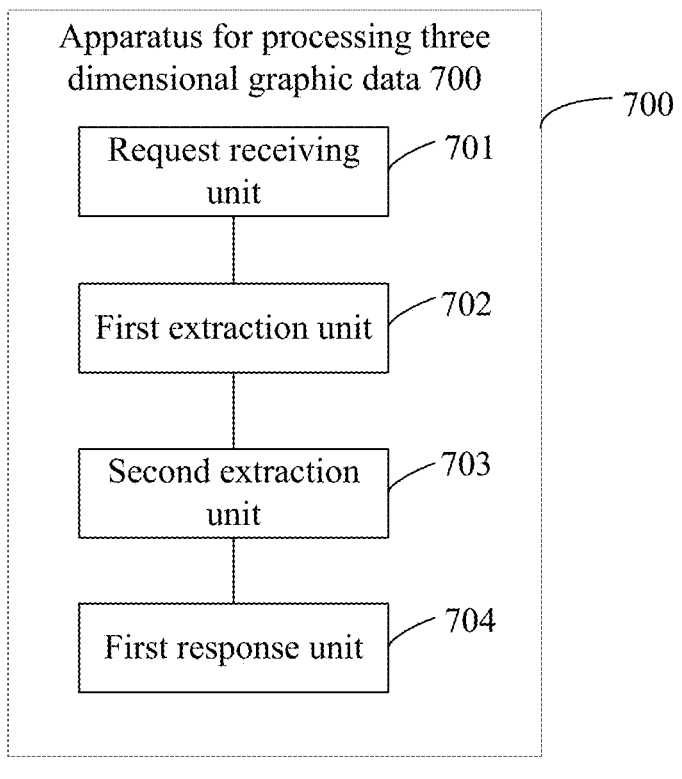
FIG. 7 is a flowchart of an embodiment of an apparatus for processing three dimensional graphic data provided by an embodiment of the present disclosure.

As shown in FIG. 7, it is a flowchart of an embodiment of an apparatus for processing three dimensional graphic data provided by an embodiment of the present disclosure, the apparatus may be configured with a method for processing three dimensional graphic data, the apparatus for processing three dimensional graphic data may locate in an electronic device. The apparatus for processing three dimensional graphic data 700 may include the following units:

a request receiving unit 701, configured to receive a data compression request for a target graphic element in a three dimensional electronic map, and obtain at least one vertex data corresponding to the target graphic element;

a first extraction unit 702, configured to extract a global coordinate matrix with a shared attribute in the at least one vertex data;

a second extraction unit 703, configured to extract local coordinate data with a private attribute respectively corresponding to the at least one vertex data;

a first response unit 704, configured to send, in response to a graphic drawing request for the target graphic element, the global coordinate matrix and the local coordinate data respectively corresponding to the at least one vertex data to a graphic display device, where the global coordinate matrix and the local coordinate data respectively corresponding to the at least one vertex data are used for drawing and displaying the target graphic element by the graphic display device.

As an embodiment, the apparatus for processing three dimensional graphic data 700 further includes:

a strategy determination unit, determine a coordinate extraction strategy of the target graphic element according to the at least one vertex data;

the first extraction unit includes:

a first extraction module, configured to extract, according to the coordinate extraction strategy of the target graphic element, the global coordinate matrix with the shared attribute from the at least one vertex data;

the second extraction unit includes:

a second extraction module, configured to extract, according to the coordinate extraction strategy of the target graphic element, the local coordinate data with the private attribute in the vertex data, to obtain the local coordinate data respectively corresponding to the at least one vertex data.

In some embodiments, the strategy determination unit includes:

a feature extraction module, configured to extract a geometric feature of the target graphic element according to the at least one vertex data;

a category determination module, configured to perform a geometric category classification on the geometric feature, to obtain a target graphic category of the target graphic element; and a strategy determination module, configured to determine the coordinate extraction strategy of the target graphic element according to the target graphic category.

In a possible design, the feature extraction module includes:

a candidate category submodule, configured to determine at least one candidate graphic category, where the candidate graphic category is associated with the coordinate extraction strategy;

a category calculating submodule, configured to calculate a category probability respectively corresponding to the geometric feature in the at least one candidate graphic category; and a category determination submodule, configured to determine a candidate graphic category with a highest category probability as the target graphic category of the target graphic element;

the strategy determination module includes:

a strategy determination submodule, configured to determine a coordinate extraction strategy associated with the target graphic category as the coordinate extraction strategy of the target graphic element.

In some embodiments, the first extraction module includes:

a shared determination submodule, configured to determine a shared primitive parameter in the coordinate extraction strategy of the target graphic coordinate;

a first extraction submodule, configured to extract shared parameter data respectively corresponding to the at least one vertex data at the shared primitive parameter; and a global calculating submodule, configured to perform a matrix conversion on the shared parameter data respectively corresponding to the at least one vertex data to obtain the global coordinate matrix with the shared attribute.

In a possible design, the second extraction module includes:

a private determination submodule, configured to determine a private primitive parameter in the coordinate extraction strategy of the target graphic element;

a second extraction submodule, configured to extract private parameter data corresponding to the at least one vertex data at the private primitive parameter; and a local determination submodule, configured to determine, according to the private parameter data corresponding to the vertex data, corresponding local coordinate data to obtain the local coordinate data respectively corresponding to the at least one vertex data.

In another possible design, further including:

an area determination unit, configured to determine a target sub-area in a space area of the three dimensional electronic map;

an element selection unit, configured to determine at least one the target graphic element from the target sub-area;

a coordinate determination unit, configured to determine the global coordinate matrix and local coordinate data respectively corresponding to the at least one vertex data of the target graphic element as target coordinate data of the target graphic element, to obtain target coordinate data respectively corresponding to the at least one target graphic element;

a data compression unit, configured to extract, from the target coordinate data respectively corresponding to the at least one target graphic element, basic coordinate data and coordinate conversion data respectively corresponding to the at least one target graphic element, where the coordinate conversion data is obtained by performing a conversion and calculation on the target coordinate data and the basic coordinate data; and a second response unit, configured to send, in response to the graphic drawing request for the at least one target graphic element, the basic coordinate data and the coordinate conversion data respectively corresponding to the at least one target graphic element to the graphic display device;

where the basic coordinate data and the coordinate conversion data respectively corresponding to the at least one target graphic element are used for determining the target coordinate data respectively corresponding to the at least one target graphic element; and the target coordinate data respectively corresponding to the at least one target graphic element is provided to the graphic display device to respectively display a corresponding target graphic element.

As another embodiment, the element selection unit includes:

an area division module, configured to divide the space area of the three dimensional electronic map into at least one map sub-area according to a tree-like area division rule;

an area tree establishment module, configured to combine the at least one map sub-area in accordance with a spatial position to obtain an area tree, where the map sub-area is a node in the area tree, and the area tree includes at least one layer; and a target determination module, configured to determine any map sub-area as the target sub-area from the area tree.

In some embodiments, the target sub-area includes at least one candidate graphic element; the element selection unit includes:

an element selection module, configured to select, from the at least one the candidate graphic element of the target sub-area, the at least one target graphic element with a same graphic category and satisfying a graphic compression condition.

In a possible design, further including:

a processing amount detection unit, configured to detect a data processing amount of the at least one vertex data;

a first processing unit, configured to, if it is determined that the data processing amount is less than a processing amount threshold, extract the global coordinate matrix with the shared attribute in the at least one vertex data and extract the local coordinate data with the private attribute respectively corresponding to the at least one vertex data, via a central processing unit; and a second processing unit, configured to, if it is determined that the data processing amount is greater than or equal to the processing amount threshold, extract the global coordinate matrix with the shared attribute in the at least one vertex data and extract the local coordinate data with the private attribute respectively corresponding to the at least one vertex data, via a graphic processing unit.

The apparatus for processing three dimensional graphic data in the embodiments of the present disclosure can perform the method for processing three dimensional graphic data in above-mentioned embodiments, for specific steps executed by respective units, modules, sub-modules, relative description of the method can be referred, which will not be repeated here.

It should be noted, the target graphic element in this embodiment is not a user element for a specific user, and cannot reflect personal information of the specific user. It should be noted, the target graphic element in this embodiment comes from a public data set.

In the technical solutions of the present disclosure, the collection, storage, usage, processing, transmission, provision, publication and other processes of a user's personal information are in compliance with the provisions of relevant laws and regulations, and do not violate public order and moral.

According to the embodiment of the present disclosure, the present disclosure also provides an electronic device, a readable storage medium and a computer program product.

According to the embodiments of the present disclosure, the present disclosure also provides a computer program product, the computer program product includes a computer program, the computer program is stored in a readable storage medium, at least one processor of an electronic device can read the computer program from the readable storage medium, and the at least one processor executes the computer program to enable the electronic device to execute the solution provided by any above-mentioned embodiment.

Figure 8:
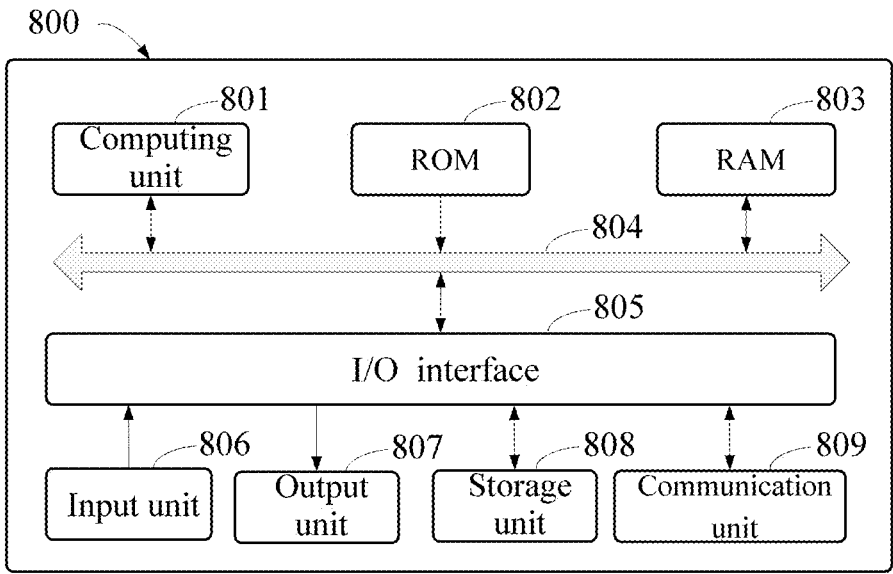
FIG. 8 is a block diagram of an electronic device for implementing the method for processing three dimensional graphic data of an embodiment of the present disclosure.

FIG. 8 shows a schematic block diagram of an example electronic device 800 which can be used to implement the embodiments of the present disclosure. An electronic device is intended to represent various forms of a digital computer, such as a laptop computer, a desktop computer, a workstation, a personal digital assistant, a server, a blade server, a mainframe computer, and other suitable computers. The electronic device can also represent various forms of a mobile apparatus, such as a personal digital assistant, a cellular phone, a smart phone, a wearable device and other similar computing apparatuses. The components, their connections and relationships, and their functions shown herein are only as examples, which are not intended to limit the implementation of the present disclosure described and/or claimed herein.

As shown in FIG. 8, the electronic device 800 contains a computing unit 801, which can execute various appropriate actions and processes according to a computer program stored in a read-only memory (ROM) 802 or a computer program loaded into a random access memory (RAM) 803 from a storage unit 808. In the RAM 803, various programs and data required for the operation of the device 800 can also be stored. The computing unit 801, ROM 802 and RAM 803 are connected to each other through a bus 804. The input/output (I/O) interface 805 is also connected to the bus 804.

Many components in the device 800 are connected to the I/O interface 805, including an input unit 806 such as a keyboard, a mouse, etc.; an output unit 807, such as various types of a display, a speaker, etc.; a storage unit 808, such as a magnetic disk, an optical disk, etc.; and a communication unit 809, such as a network card, a modem, a wireless communication transceiver, etc. The communication unit 809 allows the device 800 to exchange information/data with other devices via a computer network such as the Internet and/or various telecommunication networks.

The computing unit 801 can be various general-purpose and/or special-purpose processing components with processing and computing capabilities. Some examples of the computing unit 801 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, etc. The computing unit 801 executes various methods and processes described above, such as methods for processing three dimensional graphic data. For example, in some embodiments, the method for processing three dimensional graphic data can be implemented as a computer software program tangibly embodied in a machine-readable medium, e.g. the storage unit 808. In some embodiments, part or all of the computer program can be loaded and/or installed on the device 800 via the ROM 802 and/or the communication unit 809. When the computer program is loaded to the RAM 803 and executed by the computing unit 801, one or more steps of the method for processing three dimensional graphic data described above can be executed. Alternatively, in other embodiments, the computing unit 801 may be configured to execute the method for processing three dimensional graphic data by any other suitable means (for example, by means of firmware).

Various embodiments of the systems and technologies described above herein can be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, a firmware, a software, and/or their combination. These various embodiments may include: being implemented in one or more computer programs, where one or more computer programs can be executed and/or interpreted on a programmable system including at least one programmable processor, the programmable processor can be a dedicated or universal programmable processor which can receive data and instructions from a storage system, at least one input apparatus, and at least one output apparatus, and transmit the data and instructions to the storage system, the at least one input apparatus, and the at least one output apparatus.

Program codes for implementing the method of the present disclosure can be written in any combination of one or more programming languages. These program codes can be provided to a processor or a controller of a general-purpose computer, a special-purpose computer or other programmable data processing apparatuses, so that when being executed by the processor or controller, the program codes cause the functions/operations specified in the flowchart and/or block diagrams to be implemented. The program codes can be completely executed on a machine, partially executed on the machine, as an independent software package partially executed on the machine and partially executed on a remote machine or completely executed on the remote machine or server.

In the context of the present disclosure, the machine-readable medium can be a tangible medium that can contain or store a program for use by an instruction execution system, apparatus or device, or for use in connection with the instruction execution system, apparatus or device. The machine-readable medium can be a machine-readable signal medium or a machine-readable storage medium. The machine-readable medium may include, but is not limited to, an electronic, a magnetic, an optical, an electromagnetic, an infrared, or a semiconductor system, apparatus or device, or any suitable combination of the foregoing. More specific examples of the machine-readable storage medium may include electrical connection based on one or more wires, a portable computer disk, a hard disk, the random access memory (RAM), the read-only memory (ROM), an erasable programmable read-only memory (EPROM or flash memory), an optical fiber, a compact disk read-only memory (CD-ROM), an optical storage equipment, a magnetic storage equipment, or any suitable combination of the foregoing.

In order to provide interaction with a user, the systems and technologies described herein can be implemented on a computer, the computer has: a display apparatus (for example, CRT (cathode ray tube) or LCD (liquid crystal display) monitor) for displaying information to the user; and a keyboard and a pointing apparatus (for example, a mouse or a trackball), through the keyboard and the pointing apparatus, the user can provide input to the computer. Other kinds of apparatuses can also be used to provide interaction with the user; for example, the feedback provided to the user can be any form of sensory feedback (for example, visual feedback, auditory feedback, or tactile feedback); and can receive input from the user in any form (including acoustic input, voice input or tactile input).

The systems and technologies described herein can be implemented in a computing system including a back-end component (e.g., as a data server), or a computing system including a middleware component (e.g., an application server), or a computing system including a front-end component (e.g., a user computer with a graphical user interface or a web browser, through the graphical user interface or the web browser, the user can interact with the embodiments of the systems and technologies described herein), or a computing system including any combination of such a back-end component, a middleware component, or a front-end component. The components of the system can be connected to each other by digital data communication of any form or any medium (for example, a communication network). Examples of the communication network include: a local area network (LAN), a wide area network (WAN) and Internet.

A computer system may include a client and a server. The client and the server are generally far away from each other and usually interact through a communication network. The relationship between the client and the server is generated by computer programs running on corresponding computers and having a client-server relationship with each other. The server may be a cloud server, also known as a cloud computing server or a cloud host, which is a host product in the cloud computing service system, to solve the defects of great management difficulty and weak business scalability presented in the traditional physical host and VPS ("Virtual Private Server", or "VPS" for short) service. The server can also be a distributed system server or a server combined with block chain.

It should be understood, various forms of procedures shown above can be used to a step of reorder, add or delete. For example, the steps recorded in the present disclosure can be executed in parallel, sequentially or in a different order, so long as desired results of the technical solution disclosed in the present disclosure can be achieved, there is no restriction herein.

The above-mentioned embodiments do not limit the scope of protection of the present disclosure. Those skilled in this art should understand, various modifications, combinations, sub-combinations and substitutions can be performed according to a design requirement and other factors. Any modification, equivalent substitution and improvement, etc., within the spirit and principle of the present disclosure should be contained in the scope of protection of the present disclosure.

What is claimed is:

1. A method for processing three dimensional graphic data, comprising:
   receiving a data compression request for a target graphic element in a three dimensional electronic map, and obtaining at least one vertex data corresponding to the target graphic element;
   extracting a global coordinate matrix with a shared attribute in the at least one vertex data;
   extracting local coordinate data with a private attribute respectively corresponding to the at least one vertex data; and
   sending, in response to a graphic drawing request for the target graphic element, the global coordinate matrix and the local coordinate data respectively corresponding to the at least one vertex data to a graphic display device, wherein the global coordinate matrix and the local coordinate data respectively corresponding to the at least one vertex data are used for drawing and displaying the target graphic element by the graphic display device.

2. The method according to claim 1, further comprising:
   determining a coordinate extraction strategy of the target graphic element according to the at least one vertex data;
   the extracting the global coordinate matrix with the shared attribute in the at least one vertex data comprises:
   extracting, according to the coordinate extraction strategy of the target graphic element, the global coordinate matrix with the shared attribute from the at least one vertex data;
   the extracting local coordinate data with the private attribute respectively corresponding to the at least one vertex data comprises:
   extracting, according to the coordinate extraction strategy of the target graphic element, the local coordinate data with the private attribute in the vertex data, to obtain the local coordinate data respectively corresponding to the at least one vertex data.

3. The method according to claim 2, wherein the determining the coordinate extraction strategy of the target graphic element according to the at least one vertex data comprises:

extracting a geometric feature of the target graphic element according to the at least one vertex data;

performing a geometric category classification on the geometric feature, to obtain a target graphic category of the target graphic element; and determining the coordinate extraction strategy of the target graphic element according to the target graphic category.

4. The method according to claim 3, wherein the performing the geometric category classification on the geometric feature, to obtain the target graphic category of the target graphic element comprises:

determining at least one candidate graphic category, wherein the candidate graphic category is associated with the coordinate extraction strategy;

calculating a category probability respectively corresponding to the geometric feature in the at least one candidate graphic category;

determining a candidate graphic category with a highest category probability as the target graphic category of the target graphic element;

the determining the coordinate extraction strategy of the target graphic element according to the target graphic category comprises:

determining a coordinate extraction strategy associated with the target graphic category as the coordinate extraction strategy of the target graphic element.

5. The method according to claim 4, wherein the extracting, according to the coordinate extraction strategy of the target graphic element, the global coordinate matrix with the shared attribute from the at least one vertex data comprises:

determining a shared primitive parameter in the coordinate extraction strategy of the target graphic coordinate;

extracting shared parameter data respectively corresponding to the at least one vertex data at the shared primitive parameter; and performing a matrix conversion on the shared parameter data respectively corresponding to the at least one vertex data to obtain the global coordinate matrix with the shared attribute.

6. The method according to claim 4, wherein the extracting, according to the coordinate extraction strategy of the target graphic element, the local coordinate data with the private attribute in the vertex data, to obtain the local coordinate data respectively corresponding to the at least one vertex data comprises:

determining a private primitive parameter in the coordinate extraction strategy of the target graphic element;

extracting private parameter data corresponding to the at least one vertex data at the private primitive parameter; and determining, according to the private parameter data corresponding to the vertex data, corresponding local coordinate data to obtain the local coordinate data respectively corresponding to the at least one vertex data.

7. The method according to claim 3, wherein the extracting, according to the coordinate extraction strategy of the target graphic element, the global coordinate matrix with the shared attribute from the at least one vertex data comprises:

determining a shared primitive parameter in the coordinate extraction strategy of the target graphic coordinate;

extracting shared parameter data respectively corresponding to the at least one vertex data at the shared primitive parameter; and performing a matrix conversion on the shared parameter data respectively corresponding to the at least one vertex data to obtain the global coordinate matrix with the shared attribute.

8. The method according to claim 3, wherein the extracting, according to the coordinate extraction strategy of the target graphic element, the local coordinate data with the private attribute in the vertex data, to obtain the local coordinate data respectively corresponding to the at least one vertex data comprises:

determining a private primitive parameter in the coordinate extraction strategy of the target graphic element;

extracting private parameter data corresponding to the at least one vertex data at the private primitive parameter; and determining, according to the private parameter data corresponding to the vertex data, corresponding local coordinate data to obtain the local coordinate data respectively corresponding to the at least one vertex data.

9. The method according to claim 3, wherein after the obtaining the at least one vertex data corresponding to the target graphic element, the method further comprises:

detecting a data processing amount of the at least one vertex data;

if it is determined that the data processing amount is less than a processing amount threshold, extracting the global coordinate matrix with the shared attribute in the at least one vertex data and extracting the local coordinate data with the private attribute respectively corresponding to the at least one vertex data, via a central processing unit;

if it is determined that the data processing amount is greater than or equal to the processing amount threshold, extracting the global coordinate matrix with the shared attribute in the at least one vertex data and extracting the local coordinate data with the private attribute respectively corresponding to the at least one vertex data, via a graphic processing unit.

10. The method according to claim 2, wherein the extracting, according to the coordinate extraction strategy of the target graphic element, the global coordinate matrix with the shared attribute from the at least one vertex data comprises:

determining a shared primitive parameter in the coordinate extraction strategy of the target graphic coordinate;

extracting shared parameter data respectively corresponding to the at least one vertex data at the shared primitive parameter; and performing a matrix conversion on the shared parameter data respectively corresponding to the at least one vertex data to obtain the global coordinate matrix with the shared attribute.

11. The method according to claim 10, wherein the extracting, according to the coordinate extraction strategy of the target graphic element, the local coordinate data with the private attribute in the vertex data, to obtain the local coordinate data respectively corresponding to the at least one vertex data comprises:

determining a private primitive parameter in the coordinate extraction strategy of the target graphic element;

extracting private parameter data corresponding to the at least one vertex data at the private primitive parameter; and determining, according to the private parameter data corresponding to the vertex data, corresponding local coordinate data to obtain the local coordinate data respectively corresponding to the at least one vertex data.

12. The method according to claim 2, wherein the extracting, according to the coordinate extraction strategy of the target graphic element, the local coordinate data with the private attribute in the vertex data, to obtain the local coordinate data respectively corresponding to the at least one vertex data comprises:

determining a private primitive parameter in the coordinate extraction strategy of the target graphic element;

extracting private parameter data corresponding to the at least one vertex data at the private primitive parameter; and determining, according to the private parameter data corresponding to the vertex data, corresponding local coordinate data to obtain the local coordinate data respectively corresponding to the at least one vertex data.

13. The method according to claim 2, wherein after the obtaining the at least one vertex data corresponding to the target graphic element, the method further comprises:

detecting a data processing amount of the at least one vertex data;

if it is determined that the data processing amount is less than a processing amount threshold, extracting the global coordinate matrix with the shared attribute in the at least one vertex data and extracting the local coordinate data with the private attribute respectively corresponding to the at least one vertex data, via a central processing unit;

if it is determined that the data processing amount is greater than or equal to the processing amount threshold, extracting the global coordinate matrix with the shared attribute in the at least one vertex data and extracting the local coordinate data with the private attribute respectively corresponding to the at least one vertex data, via a graphic processing unit.

14. The method according to claim 1, further comprising:

determining a target sub-area in a space area of the three dimensional electronic map;

determining at least one target graphic element from the target sub-area;

determining the global coordinate matrix and the local coordinate data respectively corresponding to the at least one vertex data of the target graphic element as target coordinate data of the target graphic element, to obtain target coordinate data respectively corresponding to the at least one target graphic element;

extracting, from the target coordinate data respectively corresponding to the at least one target graphic element, basic coordinate data and coordinate conversion data respectively corresponding to the at least one target graphic element, wherein the coordinate conversion data is obtained by performing a conversion and calculation on the target coordinate data and the basic coordinate data; and sending, in response to the graphic drawing request for the at least one target graphic element, the basic coordinate data and the coordinate conversion data respectively corresponding to the at least one target graphic element to the graphic display device;

wherein the basic coordinate data and the coordinate conversion data respectively corresponding to the at least one target graphic element are used for determining the target coordinate data respectively corresponding to the at least one target graphic element; and the target coordinate data respectively corresponding to the at least one target graphic element is provided to the graphic display device to respectively display a corresponding target graphic element.

15. The method according to claim 14, wherein the determining the target sub-area in the space area of the three dimensional electronic map comprises:

dividing the space area of the three dimensional electronic map into at least one map sub-area according to a tree-like area division rule;

combining the at least one map sub-area in accordance with a spatial position to obtain an area tree, wherein the map sub-area is a node in the area tree, and the area tree comprises at least one layer; and determining any map sub-area as the target sub-area from the area tree.

16. The method according to claim 15, wherein the target sub-area comprises at least one candidate graphic element, the determining the at least one target graphic element from the target sub-area comprises:

selecting, from the at least one the candidate graphic element of the target sub-area, the at least one target graphic element with a same graphic category and satisfying a graphic compression condition.

17. The method according to claim 14, wherein the target sub-area comprises at least one candidate graphic element, the determining the at least one target graphic element from the target sub-area comprises:

selecting, from the at least one the candidate graphic element of the target sub-area, the at least one target graphic element with a same graphic category and satisfying a graphic compression condition.

18. The method according to claim 1, wherein after the obtaining the at least one vertex data corresponding to the target graphic element, the method further comprises:

detecting a data processing amount of the at least one vertex data;

if it is determined that the data processing amount is less than a processing amount threshold, extracting the global coordinate matrix with the shared attribute in the at least one vertex data and extracting the local coordinate data with the private attribute respectively corresponding to the at least one vertex data, via a central processing unit;

if it is determined that the data processing amount is greater than or equal to the processing amount threshold, extracting the global coordinate matrix with the shared attribute in the at least one vertex data and extracting the local coordinate data with the private attribute respectively corresponding to the at least one vertex data, via a graphic processing unit.

19. An electronic device, comprising:

at least one processor, and a memory communicatively connected to the at least one processor; wherein, the memory stores instructions executable by the at least one processor, the instructions being executable by the at least one processor, to enable the at least one processor to execute following steps:

receiving a data compression request for a target graphic element in a three dimensional electronic map, and obtaining at least one vertex data corresponding to the target graphic element;

extracting a global coordinate matrix with a shared attribute in the at least one vertex data;

extracting local coordinate data with a private attribute respectively corresponding to the at least one vertex data; and sending, in response to a graphic drawing request for the target graphic element, the global coordinate matrix and the local coordinate data respectively corresponding to the at least one vertex data to a graphic display device, wherein the global coordinate matrix and the local coordinate data respectively corresponding to the at least one vertex data are used for drawing and displaying the target graphic element by the graphic display device.

20. A non-transitory computer readable storage medium having computer instructions stored therein, wherein the computer instructions are used to cause the computer to execute the following steps:

receiving a data compression request for a target graphic element in a three dimensional electronic map, and obtaining at least one vertex data corresponding to the target graphic element;

extracting a global coordinate matrix with a shared attribute in the at least one vertex data;

extracting local coordinate data with a private attribute respectively corresponding to the at least one vertex data; and sending, in response to a graphic drawing request for the target graphic element, the global coordinate matrix and the local coordinate data respectively corresponding to the at least one vertex data to a graphic display device, wherein the global coordinate matrix and the local coordinate data respectively corresponding to the at least one vertex data are used for drawing and displaying the target graphic element by the graphic display device.

* * * * *